United States Patent
Takeda et al.

(10) Patent No.: US 11,196,519 B2
(45) Date of Patent: Dec. 7, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 1 day.

(21) Appl. No.: 16/622,187

(22) PCT Filed: Jun. 15, 2017

(86) PCT No.: PCT/JP2017/022181
§ 371 (c)(1),
(2) Date: Dec. 12, 2019

(87) PCT Pub. No.: WO2018/229947
PCT Pub. Date: Dec. 20, 2018

(65) Prior Publication Data
US 2020/0112410 A1    Apr. 9, 2020

(51) Int. Cl.
*H04L 5/00* (2006.01)
*H04W 72/12* (2009.01)
(Continued)

(52) U.S. Cl.
CPC .......... *H04L 5/0044* (2013.01); *H04L 5/0007* (2013.01); *H04L 5/0012* (2013.01);
(Continued)

(58) Field of Classification Search
CPC ........... H04W 72/1268; H04L 27/2602; H04L 5/0007; H04L 5/0012; H04L 5/0053;
(Continued)

(56) References Cited

U.S. PATENT DOCUMENTS

2011/0207493 A1    8/2011    Taoka et al.
2012/0051317 A1    3/2012    Han et al.
(Continued)

FOREIGN PATENT DOCUMENTS

EP    2330855 A1    6/2011
EP    2408250 A1    1/2012
(Continued)

OTHER PUBLICATIONS

Extended European Search Report issued in counterpart European Patent Application No. 17913664.3, dated Dec. 9, 2020 (7 pages).
(Continued)

*Primary Examiner* — Maharishi V Khirodhar
*Assistant Examiner* — Kenneth P Hunt
(74) *Attorney, Agent, or Firm* — Osha Bergman Watanabe & Burton LLP

(57) ABSTRACT

To control transmission of UL signals properly even when a CP-OFDM waveform is supported in the UL, in addition to a DFT-spread OFDM waveform, and/or support is provided for applying frequency hopping to a UL shared channel, one aspect of the present invention provides a user terminal, which has a transmission section that transmits a UL signal by using a UL shared channel, and a control section that controls a direction in which the UL signal is first mapped, between a time direction and a frequency direction, based on a waveform of the UL shared channel and/or whether or not frequency hopping is applied to the UL shared channel.

5 Claims, 14 Drawing Sheets

(51) Int. Cl.
  *H04L 27/26*     (2006.01)
  *H04B 1/713*    (2011.01)
(52) U.S. Cl.
  CPC ........ *H04L 5/0053* (2013.01); *H04L 27/2602* (2013.01); *H04L 27/2605* (2013.01); *H04L 27/2636* (2013.01); *H04W 72/1268* (2013.01); *H04B 1/713* (2013.01); *H04L 5/0092* (2013.01)
(58) Field of Classification Search
  CPC ............. H04L 27/2605; H04L 27/2636; H04L 5/0044; H04L 5/0092; H04B 1/713
  See application file for complete search history.

(56) References Cited

U.S. PATENT DOCUMENTS

| | | | |
|---|---|---|---|
| 2013/0077595 | A1 | 3/2013 | Aiba et al. |
| 2018/0110041 | A1* | 4/2018 | Bendlin ................ H04L 5/0044 |
| 2019/0364519 | A1* | 11/2019 | Fu ....................... H04W 52/325 |
| 2020/0052835 | A1* | 2/2020 | Xiong .................. H04L 1/1861 |

FOREIGN PATENT DOCUMENTS

| | | |
|---|---|---|
| EP | 2437401 A1 | 4/2012 |
| JP | 2010050936 A | 3/2010 |
| JP | 2013515390 A | 5/2013 |
| JP | 2013532393 A | 8/2013 |

OTHER PUBLICATIONS

International Search Report issued in PCT/JP2017/022181 dated Aug. 29, 2017 (2 pages).
Written Opinion of the International Searching Authority issued in in PCT/JP2017/022181 dated Aug. 29, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in counterpart Japanese Application No. 2019-524670 dated Sep. 7, 2021 (9 pages).
Intel Corporation; "UCI multiplexing onto PUSCH"; 3GPP TSG RAN WG1 Meeting #89, R1-1707399; Hangzhou, P.R. China, May 15-19, 2017 (5 pages).

* cited by examiner

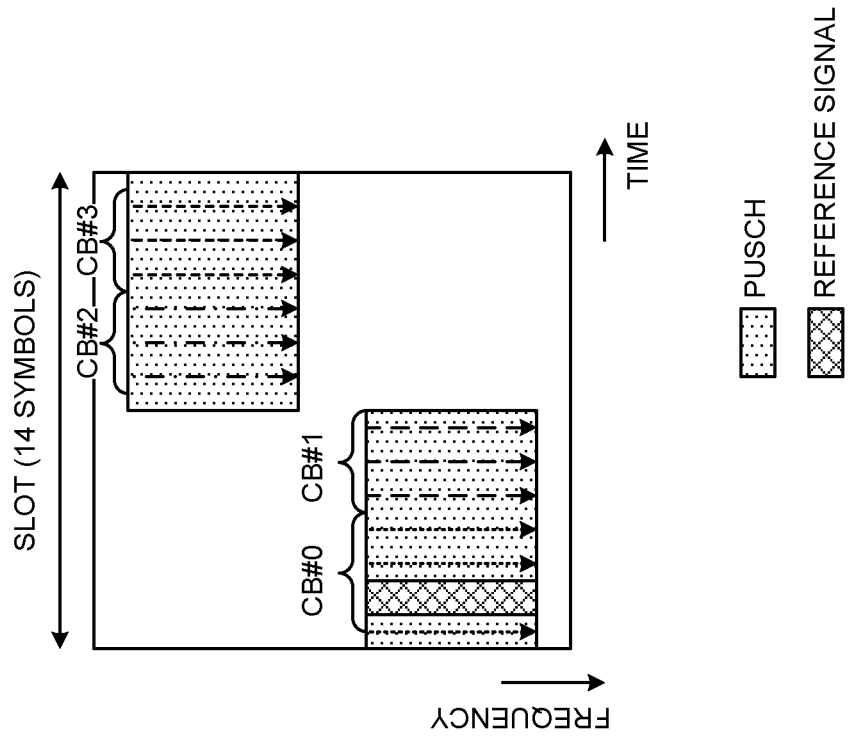
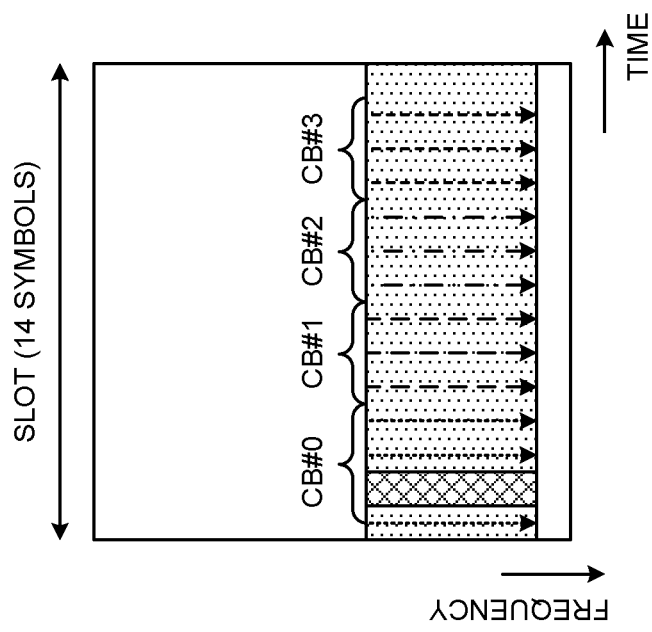

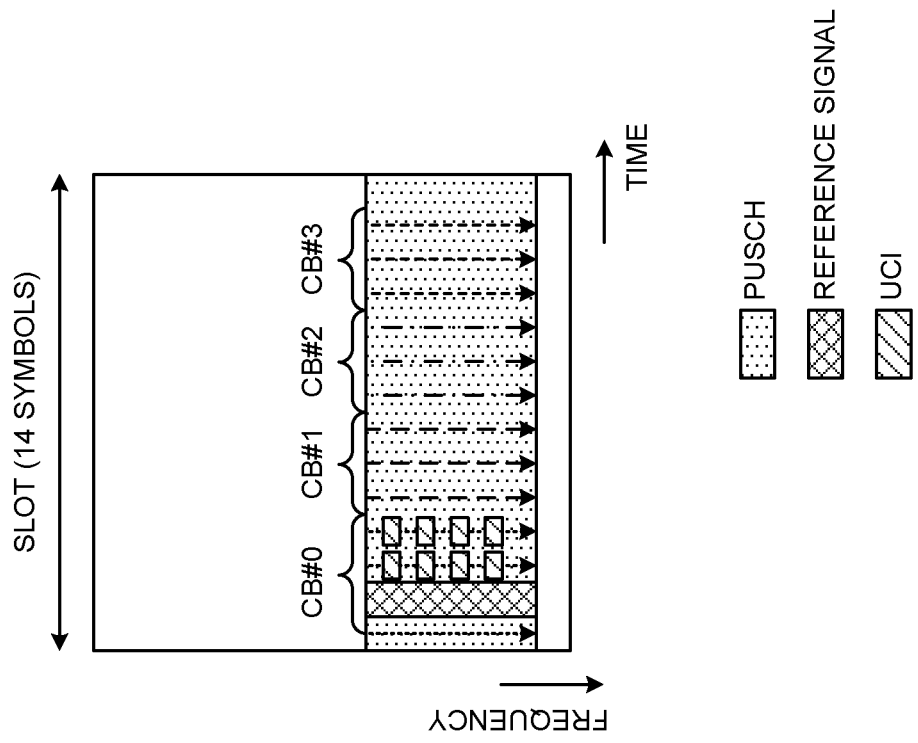
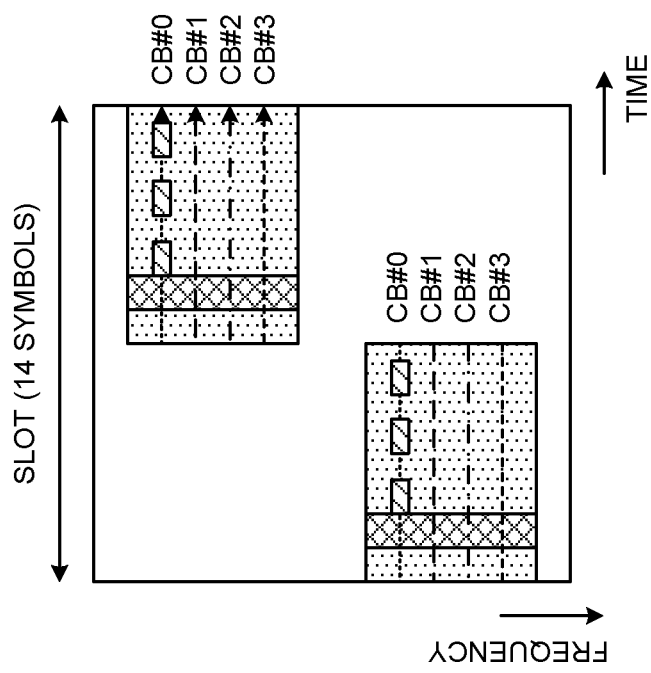

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

The uplink (UL) in existing LTE systems (for example, LTE Rel. 8 to 13) supports DFT-spread OFDM (DFT-S-OFDM (Discrete Fourier Transform-Spread-Orthogonal Frequency Division Multiplexing)) waveform. The DFT-spreading OFDM waveform is a single-carrier waveform, so that it is possible to prevent the peak-to-average power ratio (PAPR)) from increasing.

Also, in existing LTE systems (for example, LTE Rel. 8 to 13), a user terminal transmits uplink control information (UCI) by using a UL data channel (for example, PUSCH (Physical Uplink Control CHannel)) and/or a UL control channel (for example, PUCCH (Physical Uplink Control CHannel)). This transmission of UCI is controlled based on whether simultaneous transmission of PUSCH and PUCCH ("simultaneous PUSCH and PUCCH transmission") is configured, and whether PUSCH is scheduled within the TTI where this UCI is transmitted.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging the UL of future radio communication systems (for example, LTE 5G, NR, etc.), research is underway to support the cyclic prefix-OFDM (CP-OFDM (Cyclic Prefix-Orthogonal Frequency Division Multiplexing)) waveform, which is a multi-carrier waveform, in addition to DFT-spreading OFDM waveform, which is a single-carrier waveform. Note that DFT-spreading OFDM waveform can be regarded as a UL signal, to which DFT spreading (also referred to as to "DFT precoding" and the like) is applied, and the like (the phrase "with DFT spreading" may be used hereinafter to mean the same), and the CP-OFDM waveform can be regarded as a UL signal to which DFT spreading is not applied, and the like (the phrase "without DFT spreading" may be used hereinafter to mean the same).

In this way, assuming that both DFT-spread OFDM waveforms and CP-OFDM waveforms are supported in the UL of future radio communication systems, if the transmission of UL signals (for example, UL data and/or uplink control information) is controlled in the same way as in existing LTE systems (for example, LTE Rel. 8 to 13) where only DFT-spread OFDM waveforms are supported, there is a possibility that UL signals cannot be transmitted properly. For example, when mapping UL data (and UCI) to an uplink shared channel, how to control the mapping method (for example, the mapping direction) is a problem.

Also, envisaging future radio communication systems, how to provide support for application of frequency hopping to a UL data channel (UL shared channel) is presently under study. In this case, if a mapping method for existing LTE systems is used on an as-is basis, effects such as frequency diversity cannot be achieved at a satisfactory level, and there may be a decline in quality of communication.

The present invention has been made in view of the above, and it is therefore an object of the present invention to provide a user terminal and a radio communication method, whereby transmission of UL signals can be controlled properly even when a CP-OFDM waveform is supported in the UL, in addition to a DFT-spread OFDM waveform, and/or support is provided for applying frequency hopping to a UL shared channel.

Solution to Problem

According to one aspect of the present invention, a user terminal has a transmission section that transmits a UL signal by using a UL shared channel, and a control section that controls a direction in which the UL signal is first mapped, between a time direction and a frequency direction, based on a waveform of the UL shared channel and/or whether or not frequency hopping is applied to the UL shared channel.

Advantageous Effects of Invention

According to the present invention, transmission of UL signals can be controlled properly even when a CP-OFDM waveform is supported in the UL, in addition to a DFT-spread OFDM waveform and/or support is provided for applying frequency hopping to a UL shared channel.

BRIEF DESCRIPTION OF DRAWINGS

FIGS. 2A and 2B are diagrams, each showing an example case in which a mapping method of existing LTE systems is used;

FIGS. 7A and 7B are diagrams to show other examples of mapping method, according to the third example;

DESCRIPTION OF EMBODIMENTS

Envisaging the UL for future radio communication systems, studies are in progress to support a cyclic prefix OFDM (CP-OFDM) waveform (UL signal to which DFT spreading is not applied), which is a multi-carrier waveform, in addition to a DFT-spread OFDM waveform (UL signal to which DFT spreading is applied), which is a single-carrier waveform.

Whether or not DFT spreading is applied to (which one of DFT-spreading OFDM waveform and CP-OFDM waveform is used for) the PUSCH might be configured in or indicated to a user terminal by using the network (for example, a radio base station).

Figure 1A:
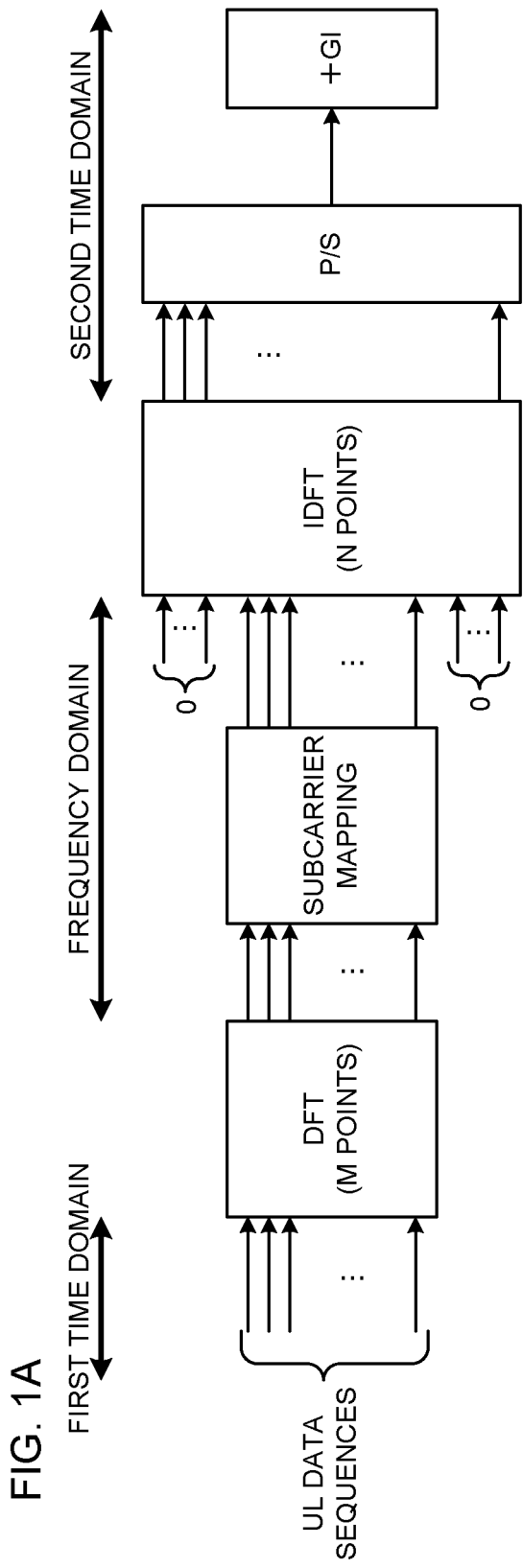
FIGS. 1A and 1B are diagrams, each showing an example of a PUSCH transmitter in future radio communication systems.

FIG. 1 are diagrams, each showing an example of a PUSCH transmitter in future radio communication systems. FIG. 1A shows an example of a transmitter using the DFT-spreading OFDM waveform. As shown in FIG. 1A, UL data sequences after coding and modulation are subjected to a discrete Fourier transform (DFT) (or a fast Fourier transform (FFT)) of M points, converted from a first time domain to the frequency domain. Outputs of the DFT are mapped to M subcarriers, subjected to an inverse discrete Fourier transform (IDFT) (or an inverse fast Fourier transform (IFFT)) of N points, and converted from the frequency domain to a second time domain.

Here, N>M holds, and information that is input to the IDFT (or the IFFT) but not used is configured to zero. By this means, IDFT outputs give signals with little instantaneous power fluctuation, and their bandwidth depends on M. IDFT outputs are subjected to a parallel/serial (P/S) conversion, and then guard intervals (GIs) (also referred to as "cyclic prefixes (CPs)" and the like) are attached. In this way, signals that have characteristics of single-carrier communication are generated by DFT-spread OFDM transmitter, and transmitted in 1 symbol.

Figure 1B:
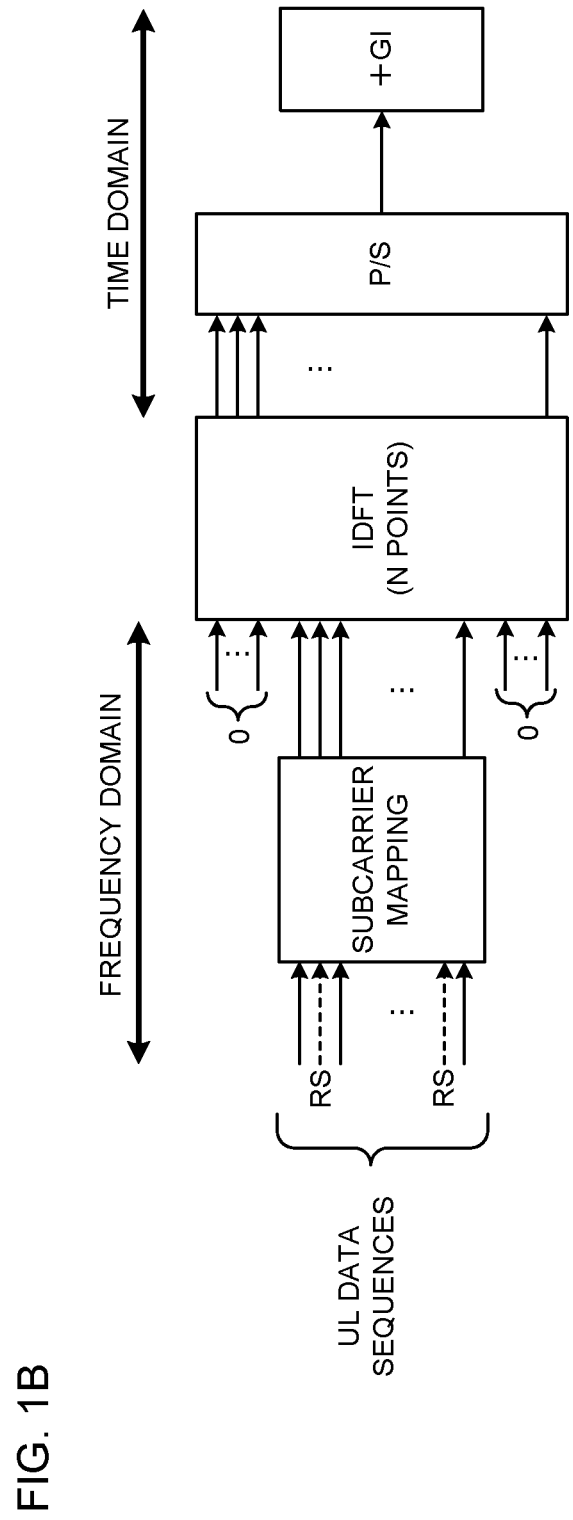

FIG. 1B shows an example of a transmitter using the CP-OFDM waveform. As shown in FIG. 1B, UL data sequences and/or reference signals (RSs), which have been encoded and modulated, are mapped to a number of subcarriers equal to the transmission bandwidth, and subjected to an IDFT (or an IFFT). Information that is input to the IDFT but not used is configured to zero. IDFT outputs are subject to a P/S conversion, and GIs are inserted. In this way, since the CP-OFDM transmitter uses multiple carriers, it is possible to frequency-division-multiplex RSs and UL data sequences.

Also, future radio communication systems might provide support for allocating one or contiguous resource units (for example, resource blocks (RBs)) and/or applying frequency hopping to PUSCH transmission where a DFT-spread OFDM waveform is used. For example, a user terminal allocates a UL signal (for example, a PUSCH signal) to one or more contiguous RBs, and transmits this UL signal by applying (or without applying) frequency hopping.

When frequency hopping is applied, it is predictable that a UL signal is allocated to varying frequency fields within a predetermined time unit (for example, a slot, a minislot, etc.) for UL transmission. For example, when 1 slot is constituted by 14 symbols, a UL signal may be allocated to different frequency fields in some symbols (for example, the first-half 7 symbols) and other symbols (for example, the second-half 7 symbols).

Now, in existing LTE systems (for example, LTE Rel. 13 and earlier versions), code block segmentation is employed, whereby a transport block (TB) that serves as a DL data scheduling unit is divided into one or more code blocks (CB), and each CB is encoded independently. The encoded bits of each CB are concatenated (for example, connected into a codeword (CW)), modulated, and mapped to available radio resources (for example, resource elements (REs)), first in the frequency direction and then in the time direction ("frequency-first time-second").

FIG. 2 provide diagrams, each showing an example case in which a mapping method of existing LTE systems is used. FIG. 2A shows a method for mapping UL signals (here, each CB) when a DFT-spread OFDM waveform (single-carrier waveform) is applied to PUSCH transmission. Note that FIG. 2A shows a case where frequency hopping is not applied. Note that the reference signal is located in the second symbol in the slot, but this is by no means limiting. The reference signal may be allocated to a specific symbol in the data transmission period, or may be allocated to a specific symbol in a slot regardless of the data transmission period.

As shown in FIG. 2A, when frequency hopping is not applied, each CB is first mapped in the frequency direction (frequency-first time-second), so that CBs can be distributed and allocated in the frequency direction, within one or more RBs, a frequency diversity effect can be achieved. Also, the time to start decoding each CB can be shifted, so that multi-staging and serialization of circuit structures and baseband processing can be facilitated.

On the other hand, when frequency hopping is applied to a PUSCH, mapping UL signals (CB mapping) in the frequency direction first might result in mapping CBs to RBs in the same frequency field (see FIG. 2B). Note that, when frequency hopping is used, reference signals may be allocated per frequency hop. FIG. 2 show cases where, when a PUSCH is transmitted by using a first frequency field and a second frequency field by applying frequency hopping, CB #0 and CB #1 are allocated only in the first frequency field, and CB #2 and CB #3 are allocated only in the second frequency field. In this case, the frequency diversity effect by frequency hopping and the like cannot be achieved at a satisfactory level, and there may be a decline in the quality of communication.

Meanwhile, under certain conditions (for example, when frequency hopping is not applied, a CP-OFDM waveform is applied, etc.), there are cases where it is more preferable to first map in the frequency direction (frequency-first).

So, the present inventors have focused on the point that which mapping direction is preferable when UL signals are transmitted varies depending on the waveform applied to UL transmission and/or whether frequency hopping is applied or not, and come up with the idea of controlling the method of mapping UL signals (for example, the mapping direction) based on predetermined conditions. Note that possible mapping directions include at least the frequency direction and the time direction, and may further include the layer direction and the like.

Now, the present embodiment will be described below. Hereinafter, the CP-OFDM waveform will be shown as an example of a multi-carrier waveform and DFT-spreading OFDM waveform will be shown as an example of a single-carrier waveform, but the present embodiment can be appropriately applied to other multi-carrier waveforms than the CP-OFDM waveform, and to other single-carrier waveforms than DFT-spreading OFDM waveform. In addition, a single-carrier waveform may be interpreted as meaning a waveform to which DFT spreading is applied, and a multi-carrier waveform may be interpreted as meaning a waveform to which DFT spreading is not applied.

Note that, according to the present embodiment, UCI may contain at least one of a scheduling request (SR), delivery acknowledgment information (also referred to as "HARQ-ACK (Hybrid Automatic Repeat reQuest-Acknowledgement)," "ACK" or "NACK (Negative ACK)," "A/N," and so on) in response to DL data channels (for example, PDSCH (Physical Downlink Shared CHannel)), channel state information (CSI), beam index information (BI), and a buffer status report (BSR).

FIRST EXAMPLE

In the first example of the present invention, when a UL signal (for example, a CW and/or a CB) is transmitted by using a UL shared channel, this UL signal is first mapped in the time direction. The mapping method that maps first in the time direction is also referred to as "time-first mapping." Time-first mapping is used at least preferentially over frequency-first mapping, in which mapping is first performed in the frequency direction.

Note that time-first mapping may be implemented by applying, to a data symbol sequence that is generated on the premise of frequency-first mapping, interleaving by means of an interleaver that is compatible with the product of the number of time resources and the number of frequency resources to which the data symbol sequence is mapped.

Figure 3A:
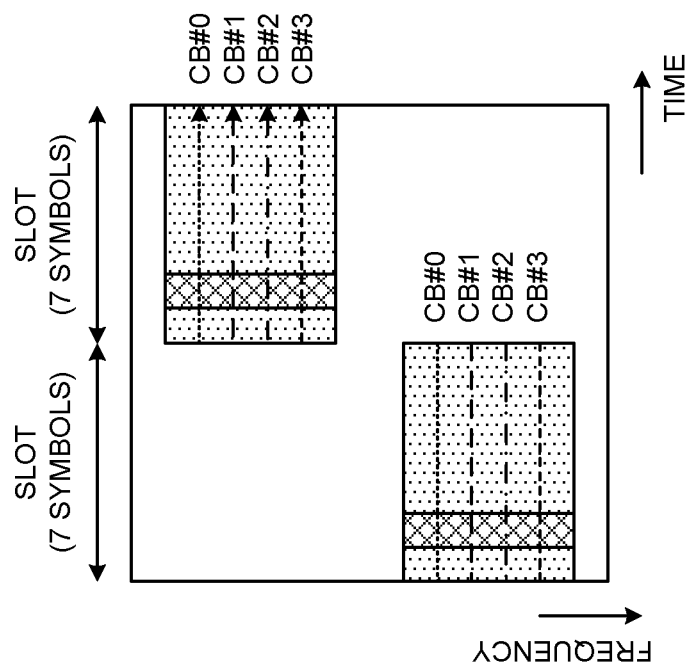
FIGS. 3A and 3B are diagrams to show examples of mapping methods, according to a first example of the present invention.

FIG. 3A shows a case in which time-first mapping is applied to UL signals (for example, UL data) transmitted in predetermined units, in PUSCH transmission using a DFT-spread OFDM waveform. In addition, FIG. 3A shows a case where frequency hopping (intra-slot FH) is applied within a predetermined time unit (here, a slot) and a PUSCH is allocated in a first frequency field and a second frequency field.

Note that FIG. 3A shows a case where mapping is performed in CB units (CB mapping), but the transmission unit for UL signals is not limited to the CB, and other units (for example, the CW unit or the code block group (CBG) unit) may be used as well. Alternatively, it may be possible to repeat the process of arranging all the data symbols to be transmitted in this channel, mapping these data symbols in the symbol direction on a given subcarrier (RE), incrementing the subcarrier (RE) index upon reaching the end of the channel, and starting mapping these data symbols in the symbol direction on the next subcarrier. In this case, mapping is performed in units of data symbols, so that time-first mapping can be performed irrespective of the CB length, the CW length and so forth. Note that a code block group (CBG) refers to a group comprised of one or more CBs.

When time-first mapping is used, each CB is first mapped in the time direction and then mapped in the frequency direction (time-first frequency-second). Therefore, a user terminal maps each CB first in the time direction (for example, over different symbols). By this means, each CB (here, CB #0 to #3) is mapped to both the first frequency field and the second frequency field to which frequency hopping is applied. As a result of this, each CB is allocated to be distributed in the frequency direction, and frequency diversity gain can be achieved.

Furthermore, when UL transmission is performed using a number of layers, mapping may be performed in the order of layer, time and frequency, or may be performed in the order of time, layer and frequency. That is, mapping has to be performed at least more preferentially in the time direction than in the frequency direction.

FIG. 3A shows a case where frequency hopping (intra-slot FH) is applied by dividing 1 slot, constituted by 14 symbols, every 7 symbols, but this is by no means limiting. For example, the symbols (to define the unit of frequency hopping) may be divided into 9 symbols and 5 symbols, or three or more different frequency fields may be configured in 1 slot, and frequency hopping may be performed using these. Also, reference signals may be allocated to each field divided in the frequency direction. Note that division-based frequency hopping control may vary between slots that vary in time.

Also, in future radio communication systems, the PUSCH is transmitted in a predetermined number of symbols. The number of symbols used to transmit the PUSCH is not fixed, and may be change (variable) based on the number of symbols in one or more slots. For example, if 1 slot is constituted by 14 symbols, the PUSCH can be transmitted by using 1 to 14 symbols when 1 slot is used, and, can be transmitted by using 28 symbols, 56 symbols or the like when 2 or 4 slots are used.

Figure 3B:
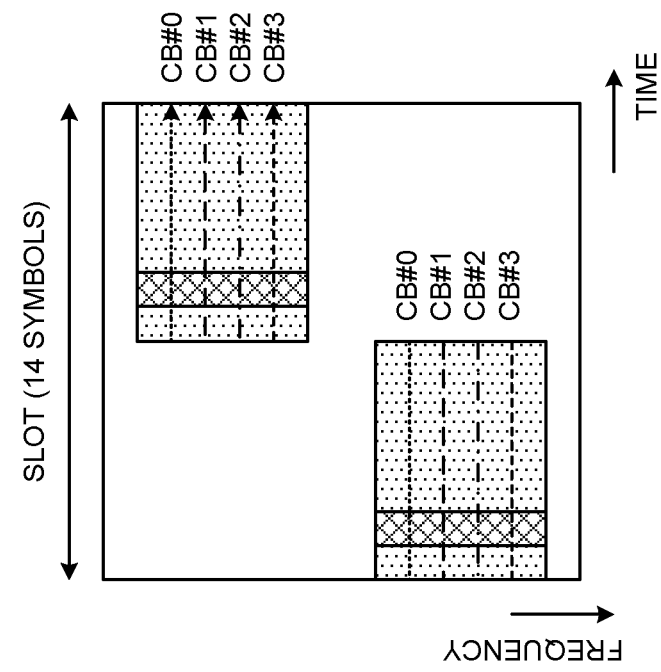

Therefore, when a PUSCH is transmitted over a number of slots, frequency hopping (inter-slot FH) may be applied across slots. Consider, for example, a case where 1 slot is comprised of 7 symbols and 1 PUSCH is transmitted over 2 slots (see FIG. 3B). In this case, a user terminal may allocate the PUSCH to frequency fields that are configured differently between varying slots, and transmit the PUSCH.

When inter-slot frequency hopping is used, the same mapping method as intra-slot frequency hopping may be used. For example, when the user terminal executes frequency hopping using 2 slots, where 1 slot is constituted by 7 symbols, the user terminal may use the same mapping method as when 1 slot constituted by 14 symbols is segmented every 7 symbols (see FIG. 3A).

In this way, time-first mapping is supported in PUSCH transmission, UL signals (for example, CBs) can be allocated to be distributed over different frequency fields by using frequency hopping. As a result of this, frequency diversity gain can be achieved, compared to the case frequency-first mapping is applied as in existing systems, so that a decline in the quality of communication can be prevented.

SECOND EXAMPLE

In the second example of the present invention, when a UL signal (for example, a UL shared channel) is transmitted, the mapping method is controlled based on the waveform applied to UL transmission and/or whether frequency hopping is applied or not. Although a case will be illustrated with the following description where UL data is transmitted in units of CBs by using a UL shared channel, the channel, the UL signal and the transmission unit to use in UL transmission are not limited these. Note that the frequency hopping in the following description assumes intra-slot frequency hopping (intra-slot FH), but inter-slot frequency hopping (inter-slot FH) may be used as well.

<Waveform to Apply to UL Transmission>

Figure 4A:
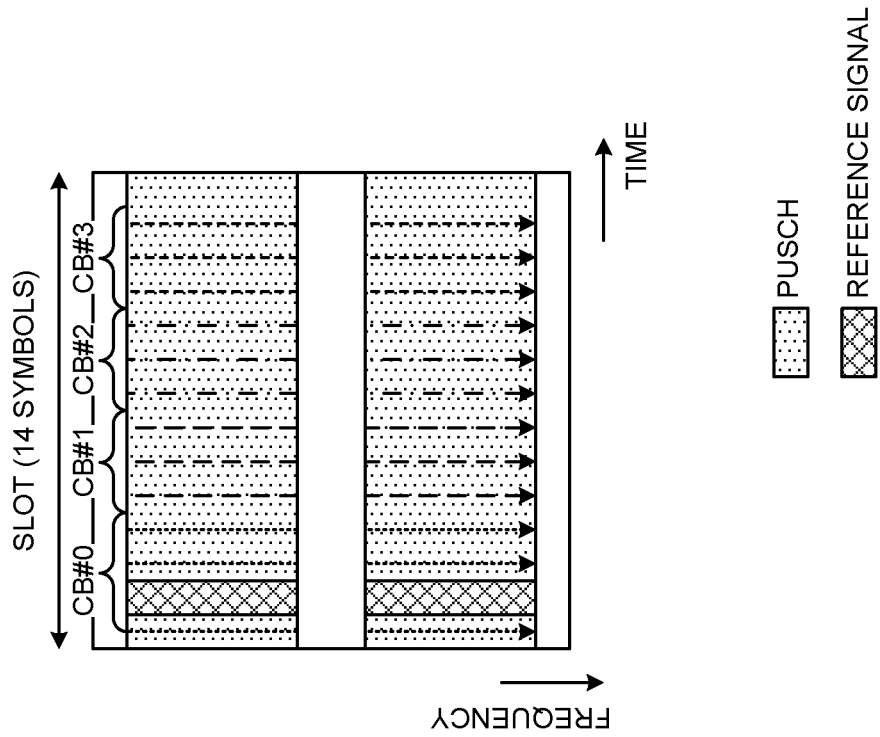
FIGS. 4A and 4B are diagrams to show examples of mapping methods, according to a second example of the present invention.

A user terminal selects the mapping method based on the waveform used to transmit a UL shared channel. For example, when the user terminal uses a DFT-spread OFDM waveform (single-carrier waveform), the user terminal selects time-first mapping, so that mapping is first performed in the time direction (see FIG. 4A). Note that, although FIG. 4A shows a case where frequency hopping is not used, when frequency hopping is used, mapping may be performed as shown in FIG. 3A.

When UL data is mapped in CB units, the user terminal maps CB #0 first in the time direction, and maps CB #0 in the frequency direction next. Following this, the user terminal maps CB #1 first in the time direction, and maps CB #1 in the frequency direction next. The same applies to CBs #2 and #3. Note that the order of mapping is by no means limited to this.

1 CB may be mapped in the time direction, and then mapped in the frequency direction and allocated in different frequency fields (for example, REs corresponding to varying frequencies), or 1 CB may be mapped only in the time direction and allocated only in the same frequency field (for example, an RE of the same frequency). FIG. 4A illustrates an example case where 1 CB is mapped only in the time direction.

When a DFT-spread OFDM waveform is used, UL signal transmission to use contiguous frequency fields (for example, RBs) is scheduled. Also, when frequency hopping is used, different frequency fields are configured in different time fields (see FIG. 3A). Consequently, by mapping in the time direction first, frequency diversity gain can be achieved effectively when frequency hopping is used. Note that, although frequency diversity effect cannot be achieved at a satisfactory level within contiguous frequency fields when frequency hopping is not used, frequency diversity effect can be achieved at a satisfactory level by using frequency hopping, as described above.

Figure 4B:
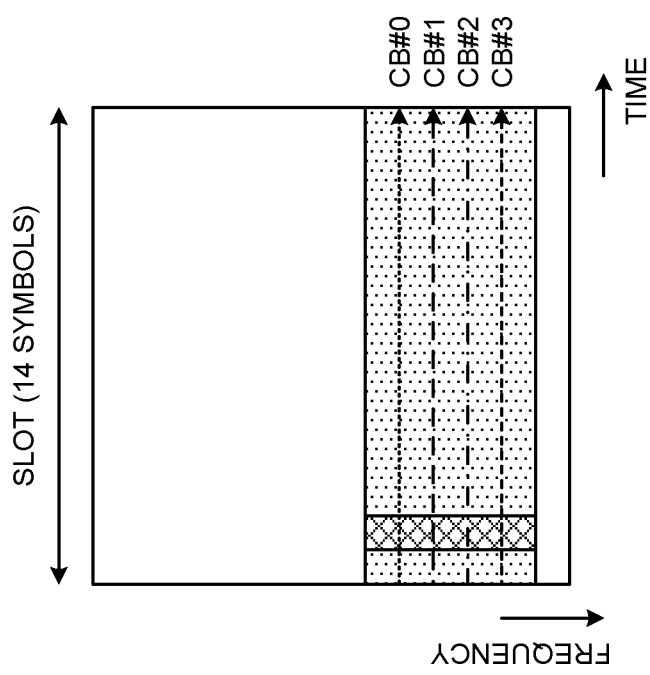

For example, when the user terminal uses a CP-OFDM waveform (multi-carrier waveform), the user terminal selects frequency-first mapping, so that mapping is first performed in the frequency direction (see FIG. 4B). When UL data is mapped in CB units, the user terminal maps CB #0 first in the frequency direction, and maps CB #0 in the time direction next. Following this, the user terminal maps CB #1 first in the frequency direction, and maps CB #1 in the time direction next. The same applies to CBs #2 and #3. Note that the order of mapping is by no means limited to this.

1 CB may be mapped in the frequency direction, and then mapped in the time direction and allocated in different time fields (for example, REs corresponding to varying times), or 1 CB may be mapped only in the frequency direction and allocated only in the same time field (for example, an RE of the same time). FIG. 4B illustrates an example case where 1 CB is mapped in the frequency direction and in the time direction.

When a CP-OFDM waveform (multi-carrier waveform) is used, UL signal transmission to use non-contiguous frequency fields (for example, RBs) is scheduled. Consequently, by mapping in the frequency direction first, UL signals (for example, CBs) can be allocated to be distributed over different frequency fields (for example, different RBs). By this means, frequency diversity gain can be achieved.

In this way, by selecting the method of mapping based on the waveform used to transmit a UL shared channel, frequency diversity gain and the like can be achieved effectively based on the transmitting waveform.

<Frequency Hopping>

The user terminal may select the mapping method depending on whether frequency hopping is used or not (regardless of the waveform). For example, the user terminal selects time-first mapping when frequency hopping is used (when frequency hopping is configured). For example, the user terminal selects frequency-first mapping when frequency hopping is not used (when frequency hopping is not configured).

In this way, when frequency hopping is used, frequency diversity effect can be achieved by distributing and mapping UL signals (for example, CBs) in different frequency fields. On the other hand, when frequency hopping is not used, UL signals can be distributed and mapped in the frequency direction within scheduled UL resources (for example, RBs).

<Waveform+Frequency Hopping>

A user terminal determines the mapping method based on the waveform used to transmit a UL shared channel and whether or not frequency hopping is used. For example, when the user terminal uses a DFT-spread OFDM waveform (single-carrier waveform) and uses frequency hopping, the user terminal selects time-first mapping, so that mapping is first performed in the time direction (see FIG. 5A). Otherwise, the user terminal selects frequency-first mapping, so that mapping is first performed in the frequency direction (see FIG. 5B and FIG. 4B).

Figure 5B:
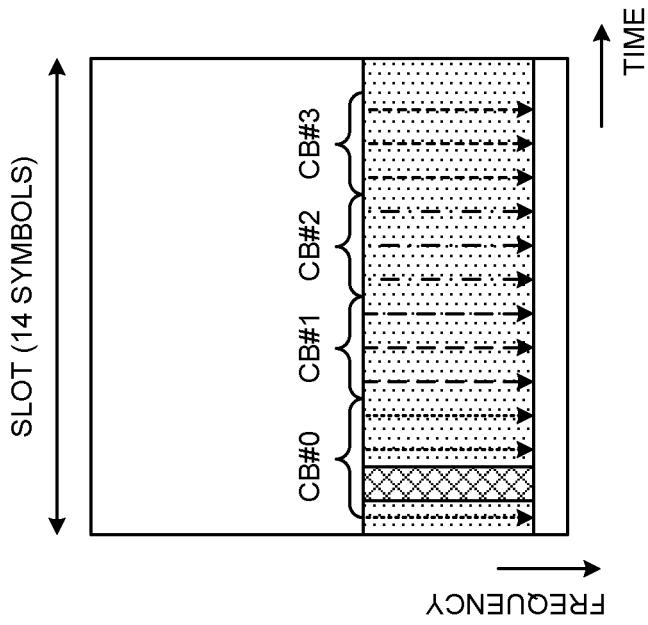
FIGS. 5A and 5B are diagrams to show other examples of mapping methods, according to the second example.
Figure 5A:
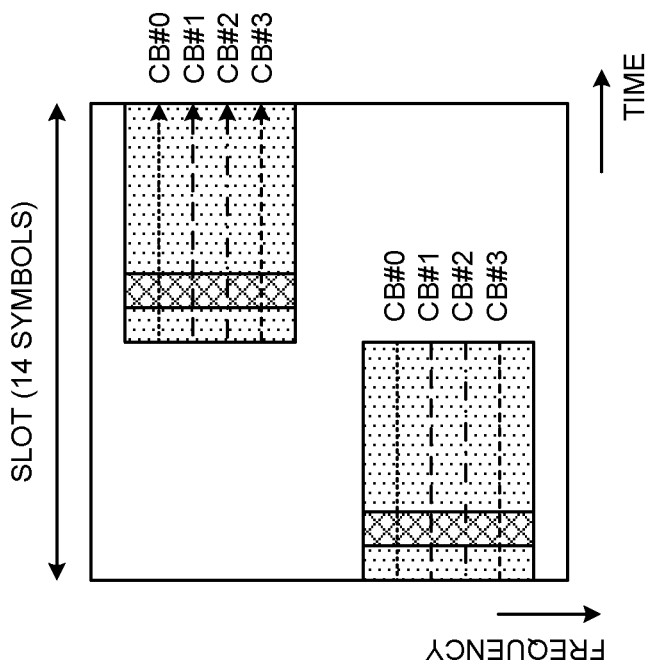

In this case, if a DFT-spread OFDM waveform (single-carrier waveform) is used but nevertheless frequency hopping is not used, UL signals (for example, CBs) can be mapped in the frequency direction in one or more contiguous RBs (see FIG. 5B). By this means, even when a UL shared channel is transmitted in a DFT-spread OFDM waveform, without applying frequency hopping, it is possible to distribute UL signals in the frequency direction to some extent (within one or contiguous RBs). Also, the time to start decoding each CB can be shifted, so that multi-staging and serialization of circuit structures and baseband processing can be facilitated.

(Variations)

Note that, although a case has been shown in the above description where a user terminal selects the direction of mapping based on predetermined conditions, information about the mapping direction (time-first mapping or frequency-first mapping) that is applicable to the user terminal may be indicated from the radio base station to the user terminal. For example, the radio base station reports a predetermined mapping direction to the user terminal by using downlink control information and/or higher layer signaling.

Alternatively, the user terminal may select the mapping direction (time-first mapping or frequency-first mapping) that is applicable to the user terminal based on both the indication from the radio base station to the user terminal and predetermined conditions. For example, if frequency-first mapping is configured by higher layer signaling, the user terminal uses frequency-first mapping regardless of whether frequency hopping is used, which waveform is used, and so forth. For example, if time-first mapping is configured by higher layer signaling, the user terminal uses one of frequency-first mapping and time-first mapping regardless of whether frequency hopping is used, which waveform is used, and so forth.

THIRD EXAMPLE

With a third example of the present invention, a mapping method for use when UCI is multiplexed over a UL shared channel will be described. An example case will be illustrated with the following description in which a delivery acknowledgment signal (HARQ-ACK) is used as UCI, but the present embodiment can be used to transmit other types of UCI as well (for example, scheduling requests, channel state information (CSI), etc.).

A user terminal multiplexes and transmits UCI on a PUSCH (that is, UCI rides piggyback on a PUSCH) based on predetermined conditions. For example, the user terminal multiplexes UCI on a PUSCH when the following conditions (1) to (3) are satisfied:

(1) In the duration in which the PUSCH is configured (PUSCH duration), the user terminal has UCI (for example, HARQ-ACK) to transmit as feedback;

(2) In the duration in which the PUSCH is configured, PUSCH transmission (for example, UL data transmission) is scheduled to the user terminal; and (3) The user terminal has no other PUCCH resources (for example, cannot use a short PUCCH).

A short PUCCH refers to a PUCCH that is configured to have a shorter duration (for example, 1 or 2 symbols) than, for example, PUCCH format 1 to 5 of existing LTE systems (for example, LTE Rel. 13 and earlier versions).

Also, in the event simultaneous transmission of a PUSCH and a PUCCH is supported (PUSCH-PUCCH simultaneous transmission is configured), if the PUSCH is not scheduled for transmission in the duration in which the PUSCH is configured, the user terminal transmits UCI by using the PUCCH. On the other hand, when the PUSCH scheduled for transmission during the duration in which the PUSCH is configured, the user terminal may transmit some UCI (for example, HARQ-ACK) by using the PUCCH and transmit other UCI by using the PUSCH.

When mapping UCI (for example, HARQ-ACK) to a UL shared channel, the user terminal distributes and maps the UCI. The user terminal distributes and allocates the UCI in the same direction as or a different direction from the direction in which UL data is mapped (for example, CB mapping). Note that, when multiplexing UCI on the PUSCH, the user terminal may perform the process of puncturing predetermined PUSCH resources (for example, REs of the PUSCH).

Now, a case where the direction in which UL data is first mapped and the direction in which UCI is distributed and allocated are different (mapping configuration 1), a case where the direction in which UL data is first mapped and the direction in which UCI is distributed and allocated are the same (mapping configuration 2), and a case combining mapping configurations 1 and 2 (mapping configuration 3) will be described below. Note that, in the description that follows, an example will be described where the direction in which UL data is first mapped is the time direction (time-first mapping) and/or the frequency direction (frequency-first mapping), but this is by no means limiting.

<Mapping Configuration 1>

Figure 6B:
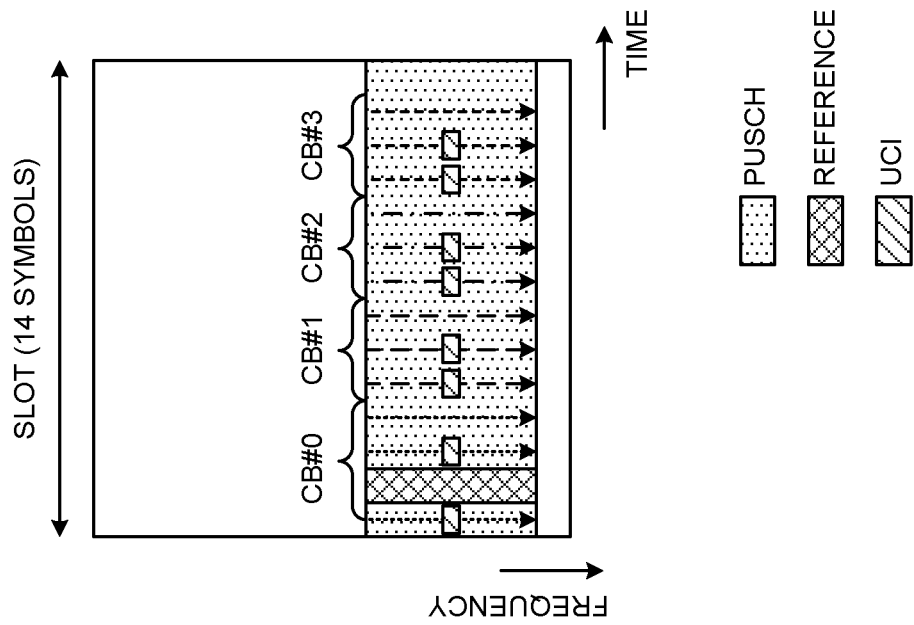
FIGS. 6A and 6B are diagrams to show examples of mapping methods, according to a third example of the present invention.
Figure 6A:
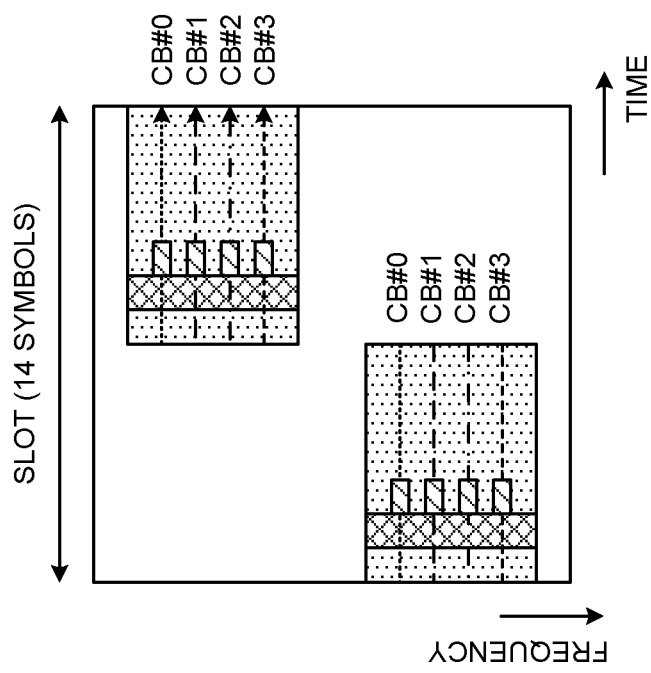

When mapping UL data in the time direction first, the user terminal maps UCI so that the UCI is also distributed in the frequency direction (see FIG. 6A). That is, when time-first mapping is applied to mapping of UL data (for example, CB mapping), frequency-distributed (freq-distributed) mapping is then applied to mapping of UCI. Note that UCI does not necessarily have to be distributed at regular intervals. This makes it possible to control the locations to map UCI, flexibly, by taking into account the locations where each CB is mapped. Also, the impact of UCI mapping per CB can be equalized, so that the degradation of throughput in each CB due to UCI mapping can be minimized.

When mapping UL data in the frequency direction first, the user terminal maps UCI so as to distribute it in the time direction (see FIG. 6B). That is, when frequency-first mapping is applied to mapping of UL data (for example, CB mapping), time-distributed mapping is then applied to mapping of UCI. Note that UCI does not necessarily have to be distributed at regular intervals. This makes it possible to control the locations to map UCI, flexibly, by taking into account the locations where each CB is mapped. Also, the impact of UCI mapping per CB can be equalized, so that the degradation of throughput in each CB due to UCI mapping can be minimized.

In mapping configuration 1, UCI is distributed and allocated in fields where each UL data (for example, each CB) is mapped. For example, referring to FIG. 6A, UCI is distributed and allocated in the frequency direction, so that UCI can be allocated to resources corresponding to CBs #0 to #3, which are mapped in the time direction. For example, referring to FIG. 6B, UCI is distributed and allocated in the frequency direction, so that UCI can be allocated to resources corresponding to CBs #0 to #3, which are mapped in the frequency direction.

With this configuration, PUSCH resources punctured by UCI can be distributed to resources of each CB, so that the impact of puncturing can be dispersed (or equalized), without concentrating on specific CBs. As a result, it is possible to prevent the error rate of specific CBs from increasing, and prevent a decline in the quality of communication.

<Mapping Configuration 2>

When mapping UL data in the time direction first, the user terminal maps UCI so that the UCI is also mapped in the time direction (see FIG. 7A). That is, when time-first mapping is applied to mapping of UL data (for example, CB mapping), time-distributed mapping is then applied to mapping of UCI. Note that UCI does not necessarily have to be distributed at regular intervals.

When mapping UL data in the frequency direction first, the user terminal maps UCI so that the UCI is also distributed in the frequency direction (see FIG. 7B). That is, when frequency-first mapping is applied to mapping of UL data (for example, CB mapping), frequency-distributed (freq-distributed) mapping is then applied to mapping of UCI. Note that UCI does not necessarily have to be distributed at regular intervals.

In mapping configuration 2, UCI is allocated to a field where specific UL data (for example, a specific CB) is mapped. For example, referring to FIG. 7A, UCI is distributed and allocated in the time direction, so that UCI can be allocated to resources correspond to a specific CB, which are mapped in the time direction. For example, referring to FIG. 7B, UCI is distributed and allocated in the frequency direction, so that UCI can be allocated to resources corresponding to a specific CB (here, CB #0), which are mapped in the frequency direction.

With this configuration, it is possible to allow the PUSCH resources to be punctured by UCI to concentrate in resources corresponding to specific CBs. In specific CBs (for example, CB #0 in FIG. 7), the likelihood the radio base station fails receipt (for example, the error rate) is higher than in other CBs (CB #1 to #3 in FIG. 7).

So, when using mapping configuration 2, it is desirable to support HARQ-ACK feedback in response to UL data in CB units or CBG units (based on CBs or based on CBGs). Thus, it is possible to retransmit specific CBs (or CGBs that include specific CBs) in a selective manner, so that an increase in overhead caused by retransmission can be reduced. As a result of this, it is not necessary to retransmit a whole TB in which a specific CB is included, so that a decrease in throughput can be prevented.

<Mapping Configuration 3>

Figure 8B:
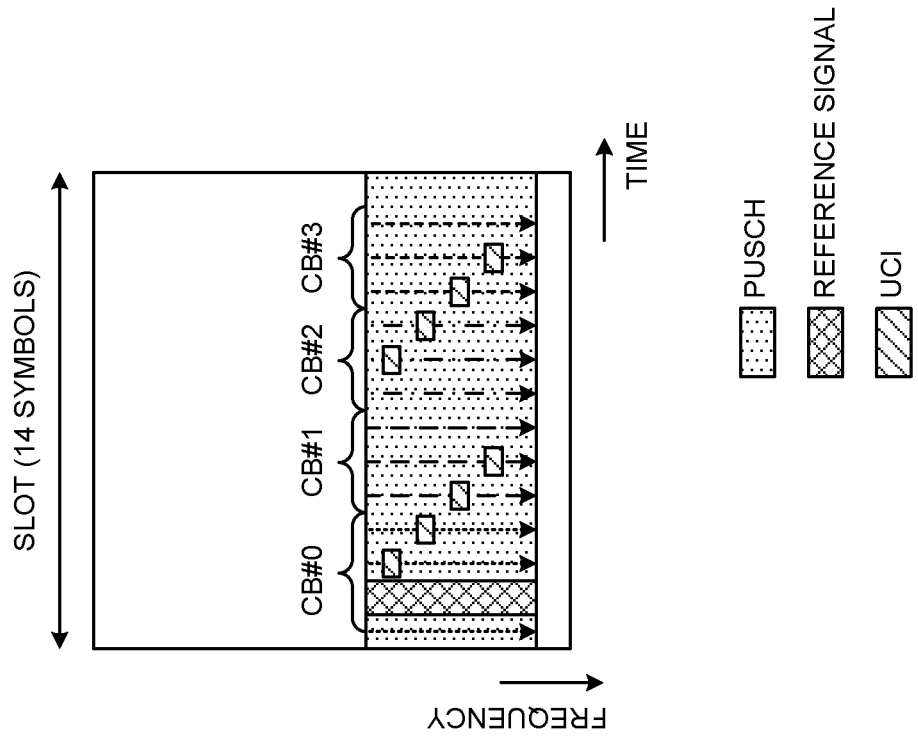
FIGS. 8A and 8B are diagrams to show other examples of mapping methods, according to the third example.
Figure 8A:
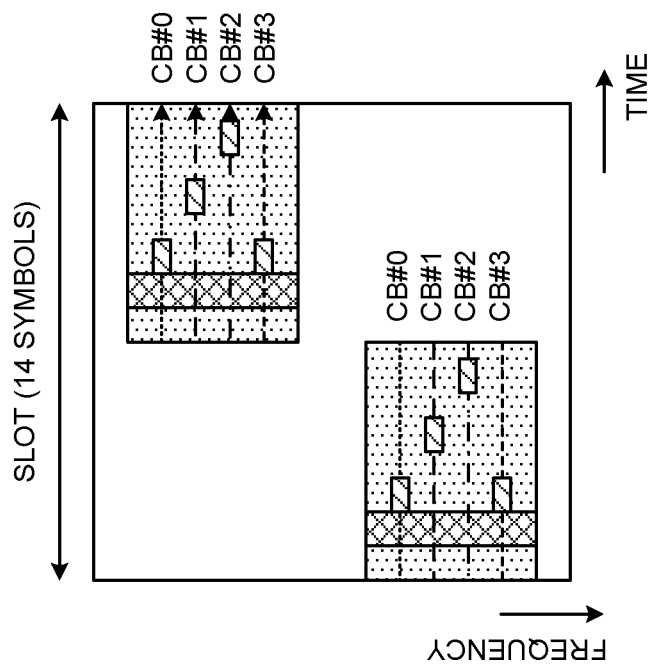

The user terminal may distribute and map UCI in the time direction and the frequency direction, regardless of in which direction UL data is first mapped. For example, when mapping UL data in the time direction first, the user terminal maps UCI so that the UCI is distributed in the frequency direction and the time direction (see FIG. 8A). When mapping UL data in the frequency direction first, the user terminal maps UCI so that the UCI is distributed in the frequency direction and the time direction (see FIG. 8B).

With this configuration, PUSCH resources punctured by UCI can be distributed to resources of each CB, so that the impact of puncturing can be dispersed (or equalized), without concentrating on specific CBs. As a result, it is possible to prevent the error rate of specific CBs from increasing, and prevent a decline in the quality of communication. Also, PUSCH resources to be punctured by UCI per CB can be distributed in the time direction and/or the frequency direction. This makes it possible to equalize the impact of puncturing by UCI upon each CB, so that the case where the error rate deteriorates only in specific CBs can be avoided.

<Variations>

Note that, although cases have been shown in the above description where a user terminal selects the direction for mapping UL data and/or the direction for distributing and allocating UCI, based on predetermined conditions, information about the mapping direction (time-first mapping or frequency-first mapping) and/or the UCI-distributing direction (time direction or frequency direction) that are applicable to the user terminal may be indicated from the radio base station to the user terminal. For example, the radio base station reports a predetermined mapping direction and/or UCI-distributing direction, to the user terminal, by using downlink control information and/or higher layer signaling.

Alternatively, the user terminal may select the mapping direction (time-first mapping or frequency-first mapping) and/or the UCI-distributing direction (time direction or frequency direction) that are applicable to the user terminal based on both the indication from the radio base station to the user terminal and predetermined conditions. For example, if frequency-first mapping is configured by higher layer signaling, the user terminal uses frequency-first mapping (and, in addition, distributes and maps UCI in the time direction or the frequency direction), regardless of whether frequency hopping is used, which waveform is used, and so forth. For example, if frequency-first mapping is configured by higher layer signaling, the user terminal uses either frequency-first mapping or time-first mapping, depending on whether frequency hopping is used, which waveform is used, and so forth.

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 9:
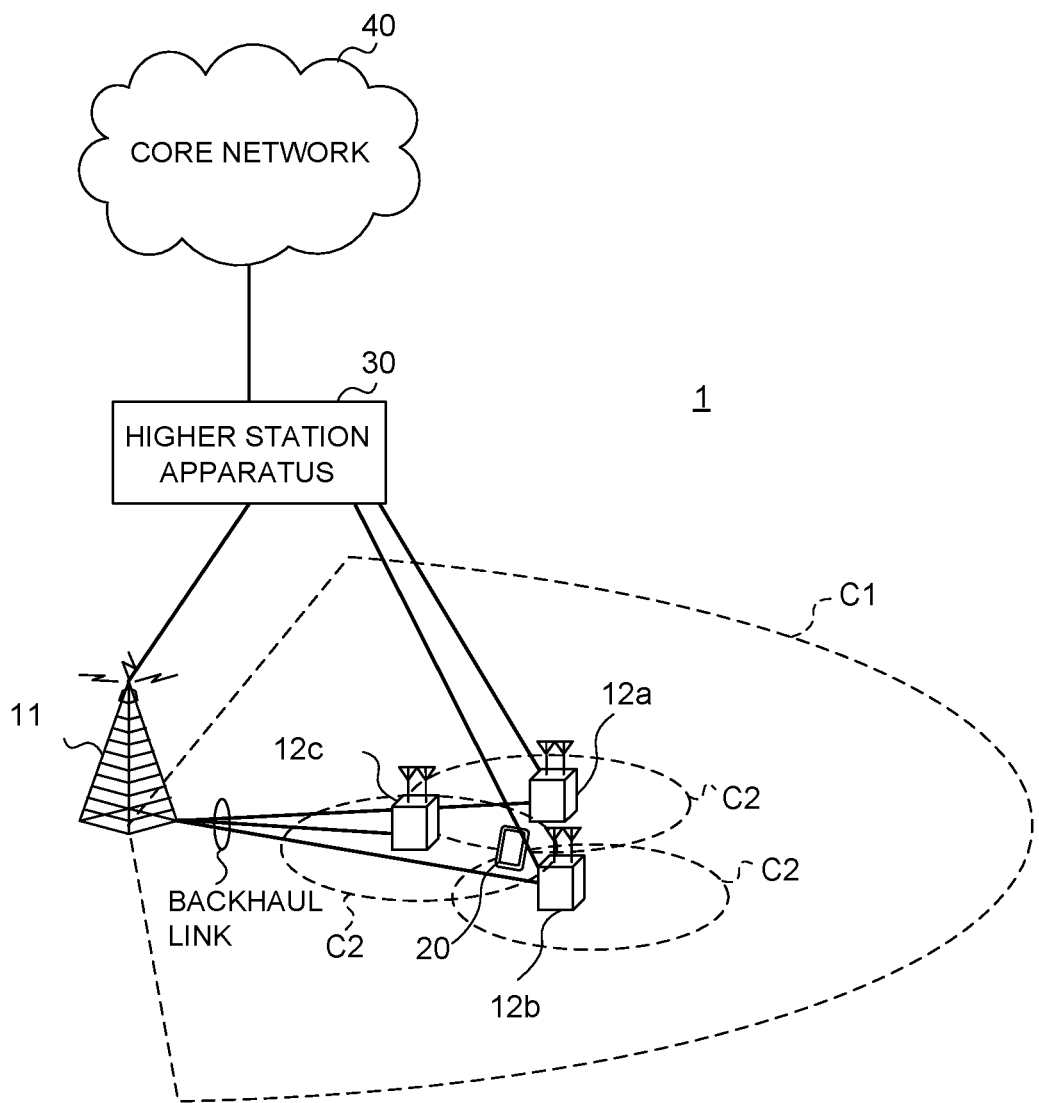
FIG. 9 is a diagram to show an exemplary schematic structure of a radio communication system according to the present embodiment.

FIG. 9 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 9 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells may be adopted. Note that a "numerology" refers to a set of communication parameters that characterize the design of signals in a given RAT and/or the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), either subframes having a relatively long time duration (for example, 1 ms) (also referred to as "TTIs," "normal TTIs," "long TTIs," "normal subframes," "long subframes," "slots," and/or the like), or subframes having a relatively short time duration (also referred to as "short TTIs," "short subframes," "slots" and/or the like) may be applied, or both long subframes and short subframe may be used. Furthermore, in each cell, subframes of 2 or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are not limited to the combinations of these, and OFDMA may be used in UL. Also, SC-FDMA can be applied to a side link (SL) that is used in inter-terminal communication.

In the radio communication system 1, a DL data channel (PDSCH (Physical Downlink Shared CHannel), also referred to as a DL shared channel and/or the like), which is used by each user terminal 20 on a shared basis, a broadcast channel (PBCH (Physical Broadcast CHannel)), L1/L2 control channels and so on are used as DL channels. At least one of user data, higher layer control information and SIBs (System Information Blocks) is communicated in the PDSCH. Also, the MIB (Master Information Block) is communicated in the PBCH.

The L1/L2 control channels include DL control channels (PDCCH (Physical Downlink Control CHannel), EPDCCH (Enhanced Physical Downlink Control CHannel), etc.)), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH and/or the EPDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (A/N, HARQ-ACK, etc.) can be communicated in at least one of the PHICH, the PDCCH and the EPDCCH.

In the radio communication system 1, a UL data channel (PUSCH (Physical Uplink Shared CHannel), also referred to as a UL shared channel and/or the like), which is used by each user terminal 20 on a shared basis, an UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI) and so on, is communicated in the PUSCH or the PUCCH. By means of the PRACH, random access preambles for establishing connections with cells are communicated.

<Radio Base Station>

Figure 10:
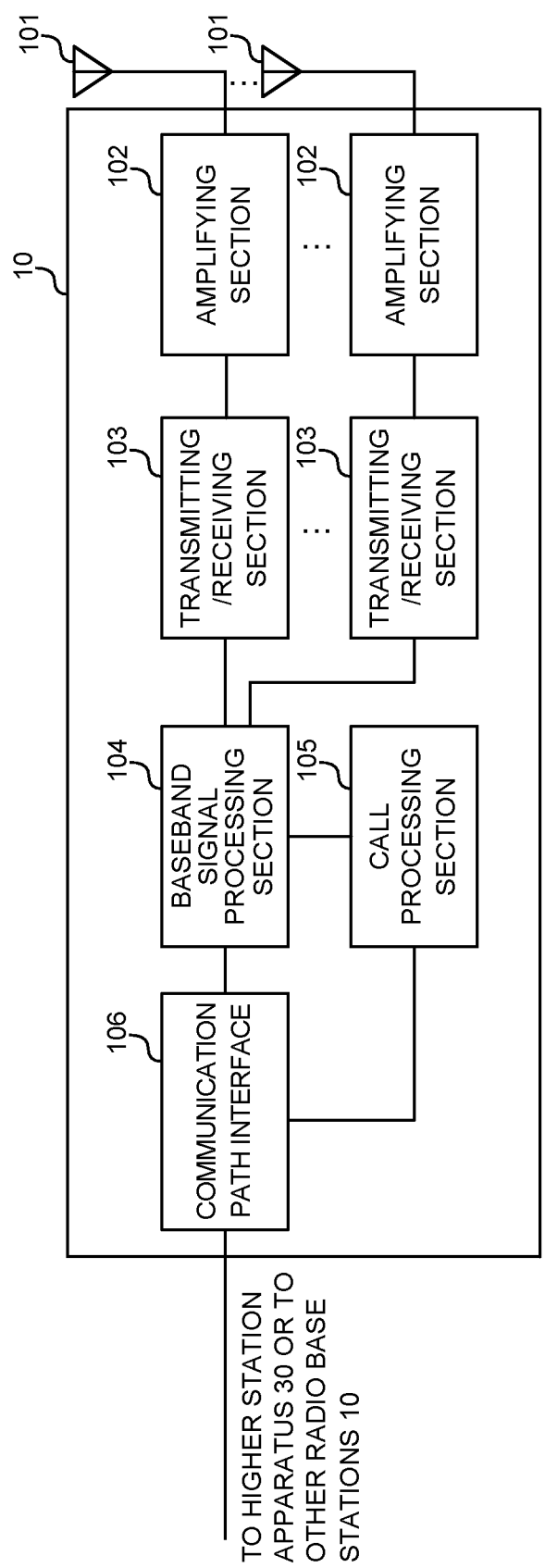
FIG. 10 is a diagram to show an exemplary overall structure of a radio base station according to the present embodiment.

FIG. 10 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit and receive DL signals and/or UL signals, to which a DFT-spread OFDM waveform (single-carrier waveform) and/or a CP-OFDM waveform (multi-carrier waveform) are applied. In addition, the transmitting/receiving sections 103 receive UL signal that are first mapped in a predetermined direction. Also, the transmitting/receiving sections 103 may report at least one of whether frequency hopping is applied to UL signals and/or a UL channel (for example, a UL shared channel), the waveform, the mapping method (mapping direction) to use, and information about the direction in which UCI is distributed, to a user terminal.

Figure 11:
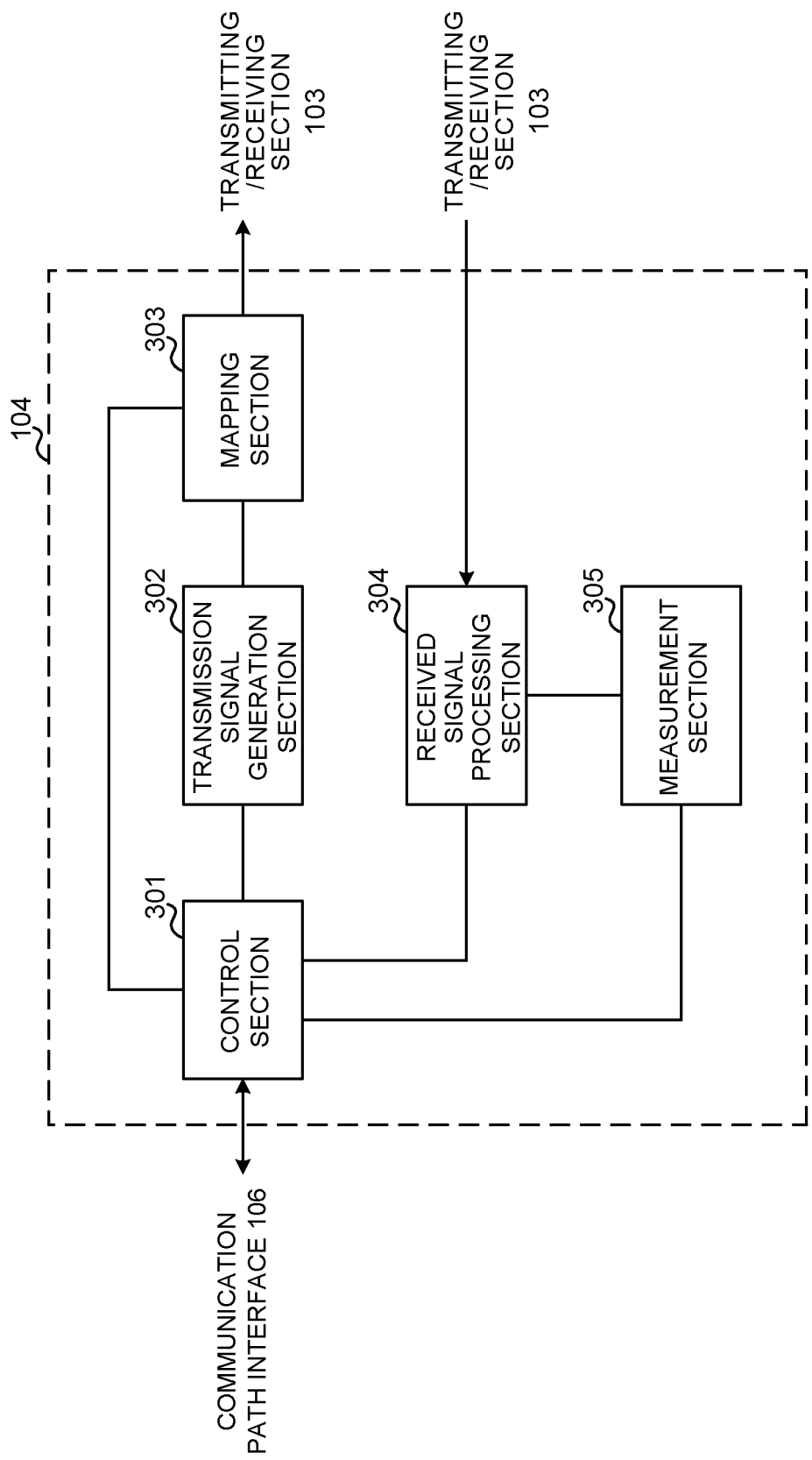
FIG. 11 is a diagram to show an exemplary functional structure of a radio base station according to the present embodiment.

FIG. 11 is a diagram to show an exemplary functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

The control section 301 schedules user terminals 20. To be more specific, the control section 301 may control the scheduling and/or retransmission of DL data and/or UL data channels based on UCI (for example, CSI) from the user terminal 20. In addition, the control section 301 may control reporting of information about the above-mentioned PUSCH waveform, and/or reporting of whether or not frequency hopping is applied to UL signals.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals, the signals after the receiving processes and so on, to the measurement section 305. In addition, the received signal processing section 304 performs UCI receiving processes based on UL control channel configuration commanded from the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 12:
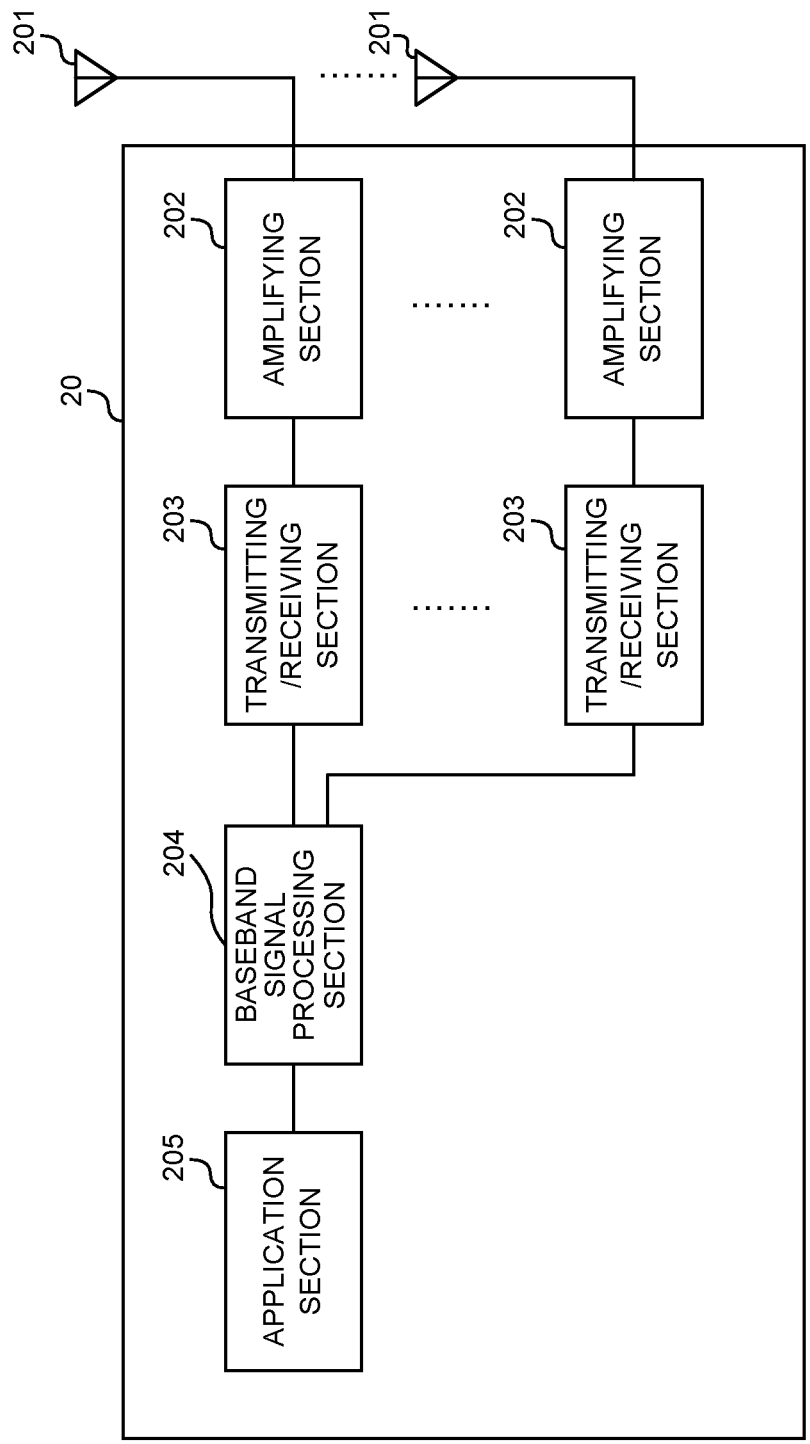
FIG. 12 is a diagram to show an exemplary overall structure of a user terminal according to the present embodiment.

FIG. 12 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 transmit and receive DL signals and/or UL signals, to which a DFT-spread OFDM waveform (single-carrier waveform) and/or a CP-OFDM waveform (multi-carrier waveform) are applied. In addition, the transmitting/receiving sections 203 transmit UL signal that are first mapped in a predetermined direction. Also, the transmitting/receiving sections 203 may be reported at least one of whether frequency hopping is applied to UL signals and/or a UL channel (for example, a UL shared channel), the waveform, the mapping method (mapping direction) to use, and information about the direction in which UCI is distributed, to a user terminal.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as 1 transmitting/receiving section, or may be formed with a transmitting section and a receiving section.

Figure 13:
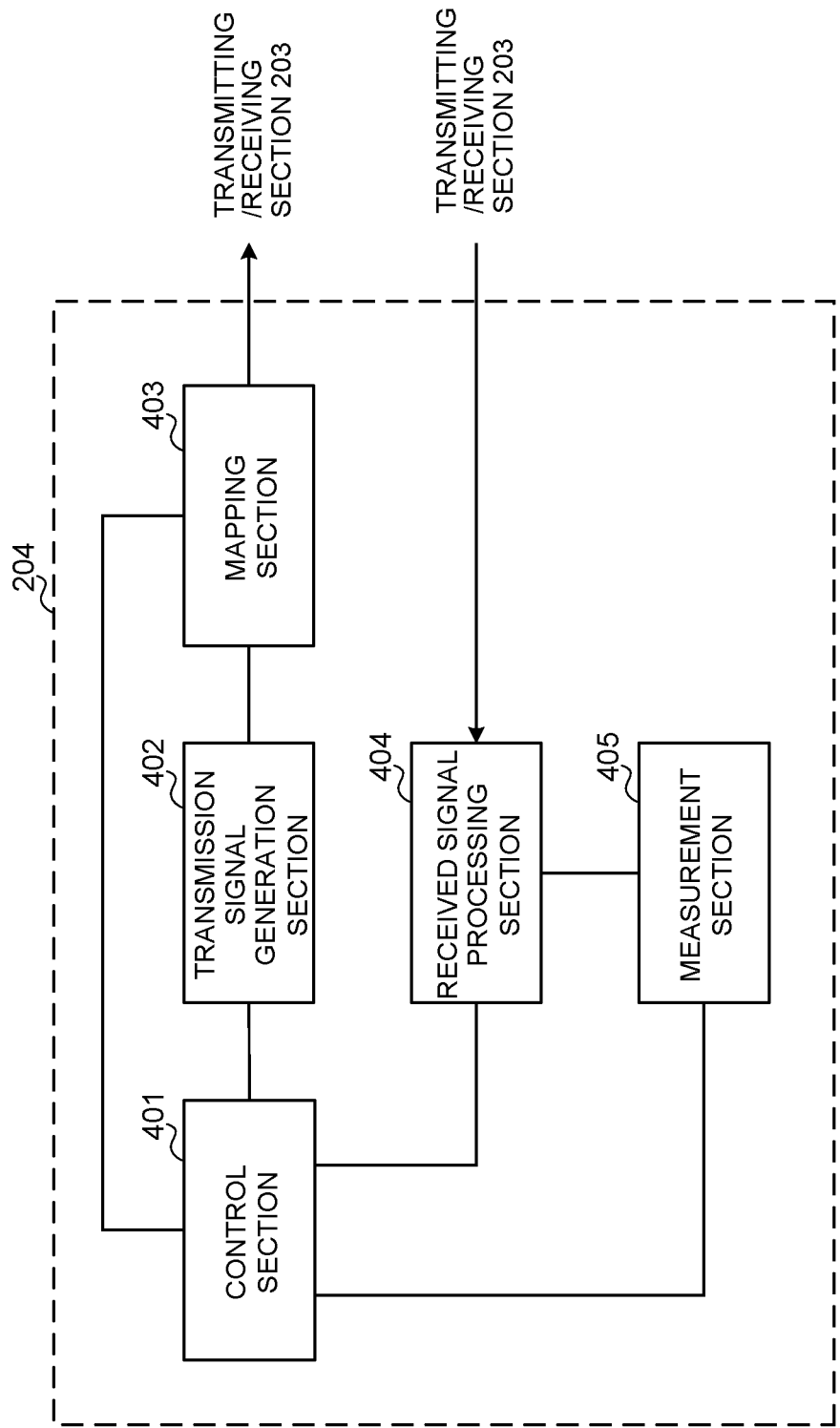
FIG. 13 is a diagram to show an exemplary functional structure of a user terminal according to the present embodiment.

FIG. 13 is a diagram to show an exemplary functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

In addition, the control section 401 controls the direction in which a UL signal is first mapped, between the time direction and the frequency direction, based on the waveform of a UL shared channel and/or whether or not frequency hopping is applied to the UL shared channel. For example, when the waveform of the UL shared channel is a single-carrier waveform, and/or frequency hopping is applied to the UL shared channel, the control section 401 controls the UL signal to be mapped first in the time direction (that is, applies time-first mapping) (see FIG. 3, FIG. 4A and FIG. 5A).

For example, when the waveform of the UL shared channel is a single-carrier waveform, and/or frequency hopping is applied to the UL shared channel, the control section 401 controls the UL signal to be mapped first in the frequency direction (that is, applies frequency-first mapping) (see FIG. 4B and FIG. 5B).

Also, when UL data and UL control information are multiplexed over the UL shared channel, the control section 401 controls the UL control information to be distributed and allocated in a different direction from the direction in which UL data is first mapped (see FIG. 6). Also, when UL data and UL control information are multiplexed over the UL shared channel, the control section 401 controls the UL control information to be distributed and allocated in a different direction from the direction in which UL data is first mapped (see FIG. 7).

The control section 401 can be constituted by a controller, a control circuit or control apparatus that can be described based on general understanding of the technical field to which the present invention pertains.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. The transmission signal generation section 402 can b e constituted by a signal generator, a signal generation circuit or signal generation apparatus that can be described based on general understanding of the technical field to which the present invention pertains.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire or wireless, for example) and using these multiple pieces of apparatus.

Figure 14:
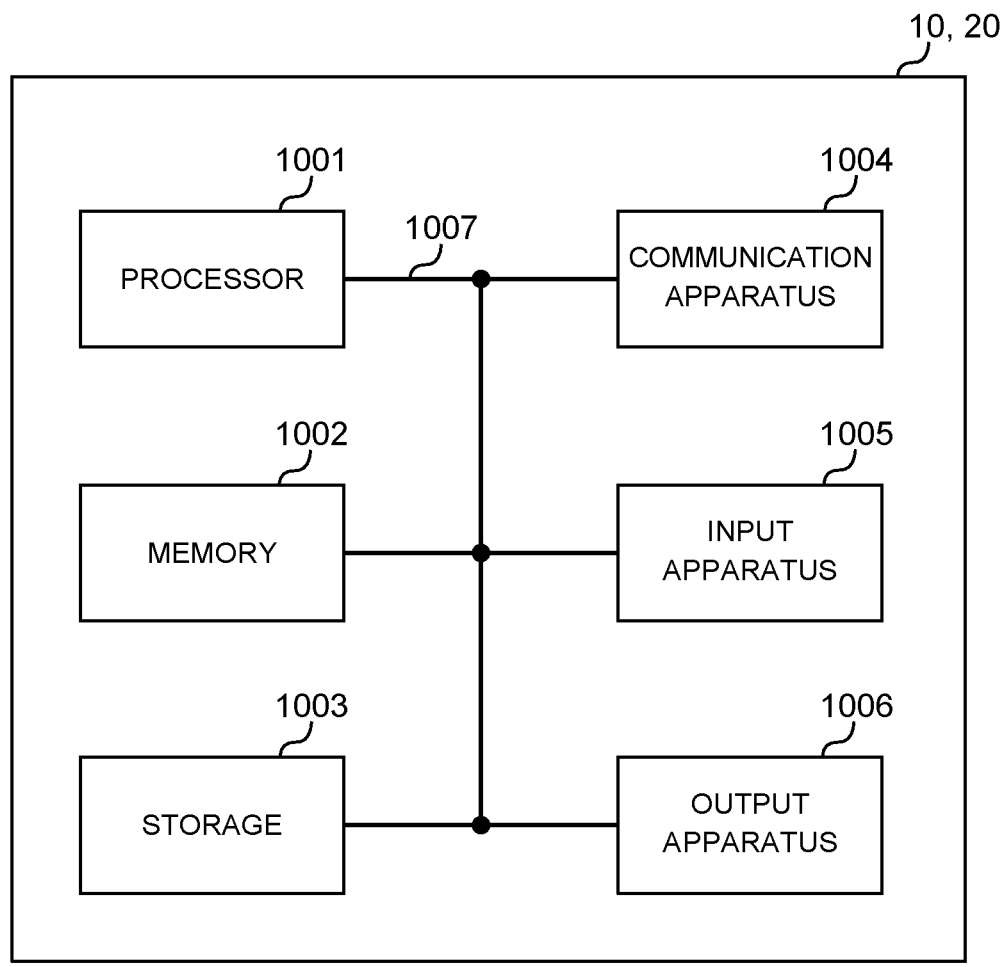
FIG. 14 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 14 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single-carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a transmitter that transmits UL control information on a UL shared channel; and
   a processor that, when the UL control information and UL data are multiplexed to the UL shared channel, controls to map the UL control information in a same direction as a direction in which the UL data is first mapped, between a time direction and a frequency direction, wherein
   the processor maps the UL control information in the frequency direction preferentially.

2. The terminal according to claim 1, wherein the processor applies frequency hopping to the UL shared channel.

3. A radio communication method for a terminal, comprising:
   transmitting UL control information on a UL shared channel;
   when the UL control information and UL data are multiplexed to the UL shared channel, controlling to map the UL control information in a same direction as a direction in which the UL data is first mapped, between a time direction and a frequency direction; and
   mapping the UL control information in the frequency direction preferentially.

4. A base station comprising:
   a receiver that receives UL control information transmitted on a UL shared channel; and
   a processor that, when the UL control information and UL data are multiplexed to the UL shared channel, judges that the UL control information is mapped in a same direction as a direction in which the UL data is first mapped, between a time direction and a frequency direction, wherein
   the processor judges that the UL control information is mapped in the frequency direction preferentially.

5. A system comprising: a terminal and a base station, the terminal comprising:
   a transmitter that transmits UL control information on a UL shared channel; and
   a first processor that, when the UL control information and UL data are multiplexed to the UL shared channel, controls to map the UL control information in a same direction as a direction in which the UL data is first mapped, between a time direction and a frequency direction, wherein the first processor maps the UL control information in the frequency direction preferentially, and
   the base station comprising:
   a receiver that receives the UL control information; and
   a second processor that, when the UL control information and the UL data are multiplexed to the UL shared channel, judges that the UL control information is mapped in a same direction as a direction in which the UL data is first mapped, between a time direction and a frequency direction, wherein
   the second processor judges that the UL control information is mapped in the frequency direction preferentially.

* * * * *